United States Patent
Breiholz et al.

(10) Patent No.: US 7,200,217 B2
(45) Date of Patent: *Apr. 3, 2007

(54) SAS SERVICE ARCHITECTURE

(75) Inventors: Andreas Breiholz, Grossbottwar (DE); Bernd Gasser, Leinfelden-Echterdingen (DE); Reinhard Hein, Löchgau (DE); Klaus-Peter Kuemmel, Fellbach (DE); Bernd Schnaitmann, Ludwigsburg (DE)

(73) Assignee: Alcatel, Paris (FR)

( * ) Notice: Subject to any disclaimer, the term of this patent is extended or adjusted under 35 U.S.C. 154(b) by 296 days.

This patent is subject to a terminal disclaimer.

(21) Appl. No.: 10/802,844

(22) Filed: Mar. 18, 2004

(65) Prior Publication Data

US 2005/0013427 A1    Jan. 20, 2005

(30) Foreign Application Priority Data

Mar. 19, 2003   (EP) .................... 03290706

(51) Int. Cl.
*H04L 12/28* (2006.01)
*H04M 7/00* (2006.01)

(52) U.S. Cl. ............ 379/221.08; 370/351; 370/389; 379/221.1; 379/221.11; 379/221.12

(58) Field of Classification Search ........... 370/351, 370/352, 353, 354, 355, 356, 389; 379/221.08, 379/221.09, 221.1, 221.11, 221.12, 230
See application file for complete search history.

(56) References Cited

U.S. PATENT DOCUMENTS

| | | | |
|---|---|---|---|
| 5,712,908 A * | 1/1998 | Brinkman et al. | 379/114.28 |
| 6,011,803 A * | 1/2000 | Bicknell et al. | 370/467 |
| 6,366,658 B1 * | 4/2002 | Bjornberg et al. | 379/221.08 |
| 6,631,186 B1 * | 10/2003 | Adams et al. | 379/201.12 |
| 6,662,017 B2 * | 12/2003 | McCann et al. | 455/461 |
| 6,714,533 B1 * | 3/2004 | Weich et al. | 370/352 |
| 6,731,741 B1 * | 5/2004 | Fourcand et al. | 379/221.08 |
| 6,826,198 B2 * | 11/2004 | Turina et al. | 370/467 |
| 7,010,114 B2 * | 3/2006 | Stahl et al. | 379/221.1 |
| 2002/0131400 A1 * | 9/2002 | Tinsley et al. | 370/352 |
| 2003/0228123 A1 * | 12/2003 | Andrews et al. | 385/143 |
| 2005/0152383 A1 * | 7/2005 | Schantz | 370/410 |

FOREIGN PATENT DOCUMENTS

EP    1 139 674 A    10/2001

OTHER PUBLICATIONS

U.S. Appl. No. 10/656,125, filed Sep. 8, 2003, entitled "SS7 Signaling Server with Integrated Signaling Services".
U.S. Appl. No. 10/642,687, filed Aug. 19, 2003, entitled "SCCP Local User Escape Method".

* cited by examiner

*Primary Examiner*—Harry S. Hong
(74) *Attorney, Agent, or Firm*—Sughrue Mion, PLLC

(57) ABSTRACT

It is an object of the invention to provide an advantageous SAS Service Architecture. The inventive SAS service architecture has a layered structure including a set of software modules, at least: ASTP dispatcher, SCCP transcoder, TCAP, TCAP user service distributor, at least two TCAP user services; ASTP=specific advanced signaling transfer protocol including routing information, etc. Within the SAS service architecture at least two different types of interactions can be configured: interaction Type A between ASTP dispatcher and TCAP user service, interaction Type B1 between TCAP user service 1 and TCAP user service 2.

10 Claims, 5 Drawing Sheets

SAS SERVICE ARCHITECTURE

This invention is related in general to the field of telecommunications systems. More particularly, the invention is related to a SS7 signaling server and method for routing SS7 links in a telecommunications network. More particularly, the invention is related to a SAS Service Architecture. The invention is related to the European patent applications EP 02360267.5, now U.S. application No. 10/655,125, and EP 02360268.3, now U.S. application No. 10/642,687, which hereby are incorporated by reference.

TECHNICAL FIELD OF THE INVENTION

This invention is related in general to the field of telecommunications systems. More particularly, the invention is related to a SS7 signaling server and method for routing SS7 links in a telecommunications network. More particularly, the invention is related to a SAS Service Architecture. The invention is related to the european patent applications EP 02360267.5 and EP 02360268.3 which hereby are incorporated by reference.

BACKGROUND OF THE INVENTION

A SS7 signaling server for routing SS7 links includes a signaling transfer point (STP) and a signaling application server (SAS). The SAS is capable to process at least one application process. Each application process, e.g. an individual INAP, MAP, CAP, or any TCAP User, TCAP Relay, or SCCP Relay service request has to be identified and processed.

The SS7 signaling server for routing SS7 links, includes e.g. a signaling transfer point (STP) and a signaling application server (SAS); SS7=Signaling System No. 7. STP and SAS have different functionalities. The STP has at least one external interface to connect the STP via at least one SS7 link to at least one telecommunications unit, and an internal interface to connect the STP to the SAS. The STP processes incoming SS7 messages, e.g. in the MTP1, MTP2, MTP3, and SCCP layer. The SAS is capable to process at least one application service request, advantageously at least two different application service requests. The STP identifies a single application service request in one incoming SS7 message and provides the identified single application service request to the SAS for further processing. The SAS has e.g. two TCAP processes to identify two different application services, e.g. INAP and MAP. STP and SAS are interconnected via an internal interworking protocol, e.g. using TCP/IP (transmission control protocol/internet protocol). The interworking protocol is called Advanced Signaling Transport Protocol (ASTP).

The signaling server is e.g. highly configurable and efficient regarding run-time. The signaling server is capable of processing multiple application service requests, e.g. mobile number portability (MNP), service number portability (SNP), screening, intelligent network (IN) services, TCAP services, MAP services, CAP services, TCAP Relay, TCAP User Relay, SCCP Relay.

The SS7 signaling server for routing SS7 links, includes e.g. a signaling transfer point (STP) and a signaling application server (SAS), wherein the STP has at least one external interface to connect the STP via at least one SS7 link to at least one telecommunications unit, and an internal interface to connect the STP to the SAS, wherein the SAS is capable to process at least one service requst, advantageously at least two different application service requests, and wherein the STP is capable to process incoming SS7 messages, to identify a single application service request in one incoming SS7 message, to provide the identified single application service request to the SAS for further processing.

SUMMARY OF THE INVENTION

It is an object of the invention to provide an advantageous SAS Service Architecture.

The inventive SAS service architecture has a layered structure including a set of software modules, at least: ASTP dispatcher, SCCP transcoder, TCAP, TCAP user service distributor, at least two TCAP user services; ASTP=specific advanced signaling transfer protocol including routing information, etc. Within the SAS service archtitecture at least two different types of interactions can be configured: interaction Type A between ASTP dispatcher and TCAP user service, interaction Type B1 between TCAP user service 1 and TCAP user service 2.

The inventive SAS service architecture makes use of configurable software modules. Each software modules performs a specific task and can easily be re-configured allowing the whole system to be very flexible and to be adapted to specific requirements via simple software reprogramming and/or adding of modules.

In a preferred embodiment the SAS service architecture further includes a plurality of further modules: SCCP Transcoder, SCCP Service Distributor, SCCP services, etc. Further types of interactions can be configured: interaction Type C between TCAP User Service m (e.g. INAP service) assigned to TCAP User Distributor A and TCAP User Service 1 (e.g. MAP service) assigned to TCAP User Distributor B, and interaction Type D between TCAP User Service m and SCCP Service n. These types of interaction are concatenation types of interaction, i.e. the SS7 message is forwarded from one module to another together with an interim analysis result. This concatenation is configurable in each module and can occur multiple times.

The SAS Service Architecture is highly configurable, and it is possible to adapt service in a very easy way to e.g. different mobile networks.

The SAS Service Architecture has a layered structure including a set of software modules, at least: ASTP Dispatcher, SCCP Transcoder for TCAP User, TCAP, at least one TCAP User Service Distributor, at least two TCAP User Services, wherein at least two different types of interactions can be configured: interaction Type A between ASTP Dispatcher and TCAP User Service, wherein the message to be processed is forwarded from the ASTP Dispatcher to the relevant TCAP User Service via SCCP Transcoder for TCAP User, TCAP, and the relevant TCAP User Service Distributor, and interaction Type B1 between two TCAP User Services assigned to the same TCAP User Service Distributor, wherein the TCAP User Service Distributor forwards the message to be processed to a second TCAP User Service dependent on the result of the outbound message of a first TCAP User Service.

Interaction Type A serves to process a Service Application request received from the STP. The message to be processed is forwarded to the specific TCAP User Service, in which the processing can be performed. The result of the processing in the TCAP User Service is forwarded to the ASTP Dispatcher which transmits the result to the STP.

Interaction Type B1 together with interaction Type A serves to increase the flexibility of processing and to reduce the time required for processing. In case the addressed TCAP User Service is not able to process the received Service Application request in a way desired by the STP, the unsatisfactory result would normally be transmitted back to the STP, which then has to start a new request which has to be forwarded to another TCAP User Service. With the help of interaction Type B1 the result of the processing in the addressed TCAP User Service is evauated in the assigned TCAP User Service Distribution A. If the result is only an interim result and one of the other TCAP User Services assigned to the TCAP User Distribution A is able to process the interim result or another part of the Service Application request then the message is forwarded to this TCAP User Service. The result of this TCAP User Service is then transmitted back to the STP. Alternatively, the result is forwarded to a third TCAP User Service for further processing or transmitted back to the first TCAP User Service in order to be further processed. Thus, the flexibility in processing an incoming Service Application request is increased.

In a preferred embodiment of the invention a further type of interaction can be configured: interaction Type C between two TCAP User Services assigned to different TCAP User Service Distributors, wherein TCAP forwards the message to be processed to a second TCAP User Service assigned to a second TCAP User Service Distributor dependent on the result of the outbound message of a first TCAP User Service assigned to a first TCAP User Service Distributor.

Interaction type C may interact with interactions Type A and B1. The flexibility in creating concatenated interactions is further increased. Thus, the flexibility in processing an incoming Service Application request is increased. This saves processing time. To achieve an adequate response to an incoming Service Application request the message to be processed has to be first processed in an INAP User Service and second in an MAP User Service. Assuming that TCAP User Service m assigned to TCAP User Distributor A (e.g.=INAP User Distributor) is an INAP User Service and TCAP User Service 1 assigned to TCAP User Distributor B (e.g.=MAP User Distributor) is a MAP User Service the Service Application request could be forwarded from ASTP Dispatcher to TCAP User Service m with the help of interaction Type A and subsequently from TCAP User Service m to TCAP User Service 1 with the help of interaction Type C, and subsequently tranmitted back to STP with the help of interaction Type A. STP receives the desired response with the help of one single request and does not have to request several times.

In a further embodiment of the invention the SAS Service Architecture further includes the software modules SCCP Transcoder, at least one SCCP Service Distributor, at least two SCCP Services, and wherein two further types of interaction can be configured: interaction Type D between a TCAP User Service and a SCCP User Service, wherein ASTP Dispatcher forwards the message to be processed to a TCAP User Service assigned to a TCAP User Service Distributor dependent on the result of the outbound message of a SCCP User Service assigned to a SCCP User Service Distributor, and interaction Type B2 between two SCCP User Services assigned to the same SCCP User Service Distributor, wherein the SCCP User Service Distributor forwards the message to be processed to a second SCCP User Service dependent on the result of the outbound message of a first SCCP User Service.

The flexibility of processing can further be increased. Not only TCAP services but also SCCP services could be included. With the help of interacton Type C a concatenation of interactions including TCAP and SCCP services can be achieved.

It is very easy to enlarge the SAS Service Architecture and the functionality. The used software modules are independently of each other. By adding further modules with other services and generating further interactions the flexibility of processing incoming Service Application requests is further increased.

The inventive SAS Service Architecture advantageously includes a common database pool to which all SAS Application Services have access. The idea of having independent modules is also used in the database pool. The pool includes several databases of different Types. The databases are independently from each other and could be accessed independently from each other. Each User Service has access to each database. The number of databases is minimized and the data stored in the databases has only to be stored once and not in many duplicats, thus saving storage place. Nevertheless, specific data which is needed simultaneously by different services can be stored in dublicats in order to increase processing time.

An inventive method to perform an analysis for a SAS application service, comprises the steps of:

performing an inbound message analysis, performing a Service Decision, performing an Outbound Message Synthesis using at least one Outbound Configuration Table.

With the help of the configuration table the result of the processing is generated. The result could be final, interim, error, etc. A final result will be transmitted back to the STP. An interim result which has to be processed in a further User Service will be forwarded to this User Service with the help of one of the interaction types. Each Service Distributor analyses the result received from a User Service and decides on the further action, e.g. forwarding to STP, forwarding to another User Service. Thus with the help of the configuration table the different kind of interaction types could be defined. As the table is configurable a reprogramming can easily be performed, e.g. when the SAS Service Arcghitecture is enlarged and more interaction types are required, etc.

In a preferred embodiment the Service Decision further includes a Generic Loop Detection Analysis using a Loop Detection Configuration Table.

The Loop Detection has the important task to check whether or not a never ending loop has occured, e.g. TCAP User Service 1 generates an interim result having the effect that with the help of interaction Type B1 TCAP User Service m has to further process the message and TCAP User Service m generates an interim result having the effect that with the help of interaction Type B1 TCAP User Service 1 has to further process the message. Detecting a loop quickly reduces undesired processing time.

In a further preferred embodiment the Service Decision further includes a Database Search in a common database pool, which includes at least a Single Number Configuration Table and a Range Number Configuration Table.

The single Number Configuration Table serves to store single numbers or attributes thereof and corresponding service control data or attributes thereof, wherein the Range Number Configuration Table serves to store ranges or attributes thereof and corresponding service control data or attributes thereof. A service control configuration table serves to store service control data or attributes thereof and corresponding service control information or attributes thereof.

Each configuration table includes several parameters and can easily be re-configured allowing the whole system to be very flexible and to be adapted to specific requirements via simple software reprogramming.

If predefined attributes (=parameters) of an assembled search digit string (e.g. assembled from a received E.164 number) could not be found in a Single Number Configuration Table a further query is done in a Range Number Configuration Table. This two step approach enables a quicker search routine. Parameters are e.g. number value, portability status, transition indicator.

The dadatase pool enables Number Portability when at least one Single Number Configuration Table serves to store E.164 single numbers or attributes thereof like E.164 Number Length, E.164 Number Value, Number Type, Portability Status, Default/Exception Indicator, Transition Indicator, Extended Match Indicator, Extended Match Length, and corresponding service control data or attributes thereof like Service Control Data Id, Service Control Data Sequence Number, and at least one Range Number Configuration Table serves to store E.164 range numbers or attributes thereof like E.164 Number Start Range Length, E.164 Number Start Range Value, E.164 Number End Range Length, E.1 64 Number End Range Value, Number Type, Portability Status, Default/Exception Indicator, Transition Indicator, Single Number Flag, and corresponding service control data or attributes thereof like Service Control Data Id, Service Control Data Sequence Number.

The dadatase pool enables in addition flexible routing when at least one Single Number Configuration Table serves to store MSIN based single numbers or attributes thereof like MSIN Based Number Length, MSIN Based Number Value, Number Type, Portability Status, Default/Exception Indicator, Transition Indicator, Extended Match Indicator, Extended Match Length, and corresponding service control data or attributes thereof like Service Control Data Id, Service Control Data Sequence Number, and at least one Range Number Configuration Table serves to store MSIN based range numbers or attributes thereof like MSIN Based Number Start Range Length, MSIN Based Number Start Range Value, MSIN Based Number End Range Length, MSIN Based Number End Range Value, Number Type, Portability Status, Default/Exception Indicator, Transition Indicator, Single Number Flag, and corresponding service control data or attributes thereof like Service Control Data Id, Service Control Data Sequence Number.

The inventive Signaling application server (SAS) comprises at least one processor, at least one database and at least one processing software for processing at least one application service request, wherein the at least one processing software includes a signaling connection control part (SCCP) process and at least one transaction capabilities application part (TCAP) process to identify at least one application service request, and wherein processing a SAS application service, comprises the steps of:
  performing an inbound message analysis,
  performing a Service Decision including a database search in a common database pool,
  performing an Outbound Message Synthesis using at least one Outbound Configuration Table.

The invenitve SS7 signaling server for routing SS7 links, includes a signaling transfer point (STP), and a signaling application server (SAS), wherein the STP has at least one external interface to connect the STP via at least one SS7 link to at least one telecommunications unit, and an internal interface to connect the STP to the SAS, wherein the SAS comprises at least one processor, at least one database and at least one processing software for processing at least one application service request, wherein processing a SAS application service, comprises the steps of:
  performing an inbound message analysis,
  performing a Service Decision including a database search in a common database pool,
  performing an Outbound Message Synthesis using at least one Outbound Configuration Table, and
  wherein the STP is capable to process incoming SS7 messages, to identify a single application service request in one incoming SS7 message, to provide the identified single application service request to the SAS for further processing.

The inventive Service Architecture has a layered structure including a set of software modules, at least: ASTP Dispatcher, SCCP Transcoder, at least one SCCP User Service Distributor, at least two SCCP User Services, wherein at least two types of interactions could be configured: interaction Type A between ASTP Dispatcher and SCCP User Service, wherein the message to be processed is forwarded from the ASTP Dispatcher to the relevant SCCP User Service via SCCP Transcoder and the relevant SCCP User Service Distributor, and interaction Type B2 between two SCCP User Services assigned to the same SCCP User Service Distributor, wherein the SCCP User Service Distributor forwards the message to be processed to a second SCCP User Service dependent on the result of the outbound message of a first SCCP User Service.

Interaction Type A serves to process a Service Application request received from the STP. The message to be processed is forwarded to the specific TCAP User Service, in which the processing can be performed. The result of the processing in the TCAP User Service is forwarded to the ASTP Dispatcher which transmits the result to the STP.

Interaction Type B1 together with interaction Type A serves to increase the flexibility of processing and to reduce the time required for processing.

The SAS Service Architecture is thus very flexble and applicable to different kind of services. In one embodiment only TCAP services are processed, in another embodiment TCAP+SCCP services are processed, in another only SCCP services, etc.

BRIEF DESCRIPTION OF THE DRAWINGS

For a better understanding of the present invention, reference is made to the accompanying drawings, in which.

DETAILED DESCRIPTION OF THE INVENTION

Figure 1:
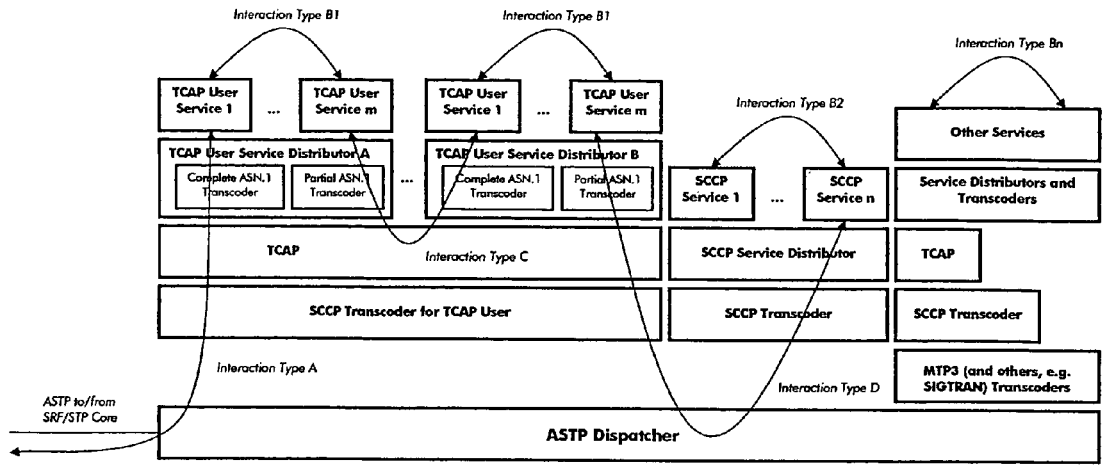
FIG. 1 shows the inventive SAS Service Architecture: Overview.

The preferred embodiments of the present invention are illustrated in FIGS. 1–16, like reference numerals being used to refer to like and corresponding parts of the various drawings.

1. SAS Service Architecture

FIG. 1 depicts the overview of the SAS Service Architecture. The purpose of this architecture is to provide an extendible framework for the execution of services, which receive, analyse, process and generate SS7 messages. The SAS receives the SS7 messages from a SRF/STP core node. The SAS sends or returns SS7 messages to the SRF/STP core node. The SAS Service Architecture is layered. The layering principle resembles the SS7 protocol architecture.

FIG. 1 shows the SAS Service Architecture: Overview.

The ASTP Dispatcher communicates SS7 messages with the SRF/STP core. The SS7 messages are enveloped into a ASTP Header before they are packed into TCP. Examples of SS7 messages are SCCP PDUs, MTP3 PDUs, etc. The ASTP Header contains the following kinds of information:

Routing information to identify the physical computing nodes in the SRF/STP Core and the SAS Servers.

Pre-analysis information from the SRF/STP Core. This includes information, which allows the ASTP Dispatcher and the Service Distributors to uniquely identify a single SAS Service.

Analysis information from the SAS to control outbound routing in the SRT/STP Core.

Additional SS7 related information.

The ASTP Dispatcher also communicates with the SAS Services and their underlying protocol entities. The ASTP Dispatcher distributes SS7 messages enveloped into an internal header to the correct Service Distributor. Also, the ASTP Dispatcher receives SS7 messages enveloped into an internal header from the Service Distributors, and then either forwards them to the SRF/STP Core or to another Service Distributor. This decision is based on the information in the internal header. The internal header contains the following information:

Pre-analysis information from the SRF/STP Core. This includes information, which allows the ASTP Dispatcher and the Service Distributors to uniquely identify a single SAS Service.

Interim or final result information from the SAS Application Services.

The SCCP Transcoders receive/send SS7 messages enveloped in an internal header from/to the ASTP Dispatcher. The SCCP Transcoders provide to the higher layers access functions for reading and manipulating the following:

Internal Header information.

SCCP Header information.

SCCP Payload information.

The SCCP Transcoders are capable to process ITU and ANSI SCCP.

TCAP is a complete TCAP with ITU and ANSI capabilities. It does the following:

Passing through of access functions to Internal Header information.

Passing through of access functions to SCCP Header information.

Analysis of SCCP Payload information:

Processing of TCAP header information.

Access functions to TCAP payload.

The SCCP Service Distributor has the following capability:

Triggering of correct SCCP service based on internal header information.

Passing through of access functions to SCCP Header information.

Passing through of access functions to internal header information.

The TCAP User Service Distributors have the following capability:

Triggering of correct TCAP User Service based on internal header information.

Passing through of access functions to SCCP Header information.

Passing through of access functions to internal header information.

Access functions to the TCAP payload.

ASN.1 Transcoding, either using a complete or partial ASN.1 transcoder, selected by configuration data.

The types of TCAP User Service Distributors include but are not limited to INAP, MAP, CAP.

The SAS Services access their respective payload, process it and generate a response. SAS initiated TCAP dialogues are also possible. The general service architecture of a SAS service is specified below.

The SAS Service Architecture is open. I.e. SS7 capabilities can be integrated such as MTP3 PDUs and SIGTRAN. This implies the integration of additional transcoders, service distributors and services.

Service Addressing and Routing:

Each SAS Application Service can execute in multiple instances. Each instance may have a different configuration. Each instance has a unique SAS Application Service Instance Id.

The Service Distributors contain a configurable service access table. This service access table maps the addressing information of the internal headers to the SAS Application Service Instance Id.

The ASTP Dispatcher uses the ASTP Header information to identify the correct SCCP or MTP or other low-level transcoder. For this purpose, the ASTP Dispatcher contains a configurable mapping table.

Interaction Types and Service Concatenation:

There are several possibilities to interact between the SRF/STP Core and the SAS Application Services.

Interaction Type A (default type of interaction):

The interaction is started outside the SRF/STP and addresses a SAS Application Service. The SAS Application Service generates a response. The response can also be a relay of the SS7 message to another destination.

For TCAP User Services, it is also possible that the TCAP User Service initiates the interaction with a node outside the SRF/STP.

All other types of interaction are concatenation types of interaction. I.e. the SS7 message is forwarded from one SAS Application Service to another SAS Application Service together with an interim analysis result. This concatenation is configurable in each SAS Application Service and can occur multiple times. The concatenation principle implies that each SAS Application Service has to be designed in a way, that it does only one task very good. Thanks to the configuration capabilities of SAS Application Services the functionality of this service can be kept on a quite generic level. More complex signalling functions are realised by concatenation of SAS Application Services.

Interaction Types Bx (concatenation of SAS Application Services on the same Service Distributor):

The SS7 message is directly forwarded from one SAS Application Service to another SAS Application Service.

This forwarding can be configured in each SAS Application Service.

During the forwarding, the SS7 message is enveloped into the internal header including internal addressing information and interim result information from the sending SAS Application Service.

Interaction Type C (concatenation of TCAP User SAS Application Services on different Service Distributors):

The SS7 message is indirectly forwarded from one SAS Application Service to another SAS Application Service via the TCAP User Service Distributor of the sending SAS Application Service, TCAP, and the TCAP User Service Distributor of the receiving SAS Application Service.

This forwarding can be configured in each SAS Application Service.

During the forwarding, the SS7 message is enveloped into the internal header including internal addressing information and interim result information from the sending SAS Application Service.

Interaction Type D (concatenation of SAS Application Services which have only the ASTP Dispatcher as a common communication protocol entity):

The SS7 message is indirectly forwarded from one SAS Application Service to another SAS Application Service via all underlying layer entities including the ASTP Dispatcher.

This forwarding can be configured in each SAS Application Service.

During the forwarding, the SS7 message is enveloped into the internal header including internal addressing information and interim result information from the sending SAS Application Service.

Figure 2:
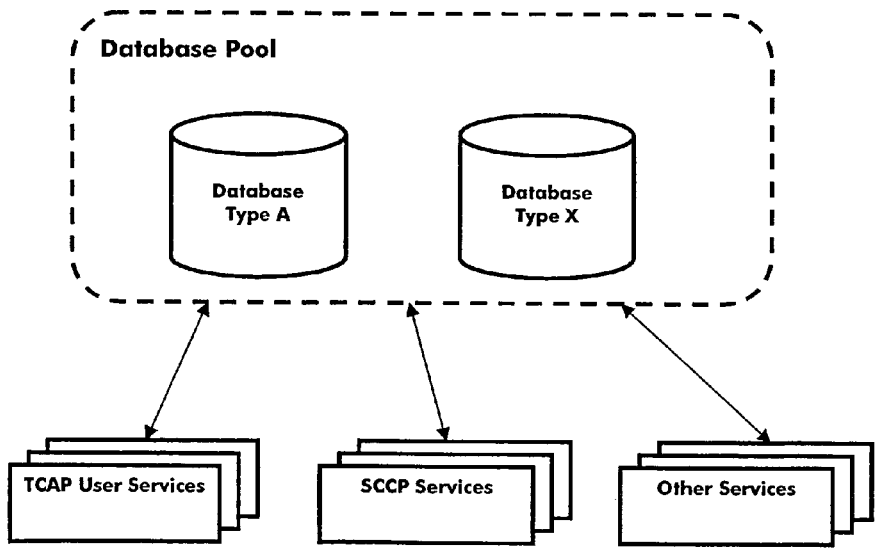
FIG. 2 shows the SAS Service Architecture Access of Database Pool.

Access of a Common Database Pool:

FIG. 2 shows how the SAS Application Services access a Common Database Pool. The database pool can include one or more logical database. Each logical database serves advantageously a different purpose. Each logical database is designed in a way that it can be accessed by various types of SAS Application Services, always using the same access functions. Examples for logical databases are MNP database, FNP database, etc.

2. Generic Structure of a SAS Application Service Many SAS Application Services have three stages, as follows:

Stage 1—Inbound Message Analysis: This stage starts with some service specific inbound protocol checks. Then the auxiliary number parts are analysed. If found and correct, then remove auxiliary number part from received E.164 or MSIN Based number and store it internally. This analysis is done step by step for each possible auxiliary number part. When the analysis of the auxiliary number parts terminates successfully, then the second stage starts.

Each auxiliary number is to be stored in a record containing its name, its position, its value, and its presence. Inbound Processing is configured based on the specification of the received digit string and other application service specific configuration items.

Stage 2—Service Decision: Analyse the core part of the received number in the Single Number and Range Number tables. Additional digits might be requested. The Extended Match Indicator is to be used if required. Service Decision includes also Loop Detection. The Service Decision is executed dependent on configuration data items and the Transition Indicator, the Default/Exception Indicator, and the Single Number Flag of the Single Number and Range Number tables.

Stage 3—Outbound Message Synthesis: Depending on the result of this database query and the inbound processing, the response is generated. Outbound processing is configured based on the specification of the digit string to be sent off, the Service Control Data Record, the Number Type and the Portability Status, and other configuration data items.

Figure 3:
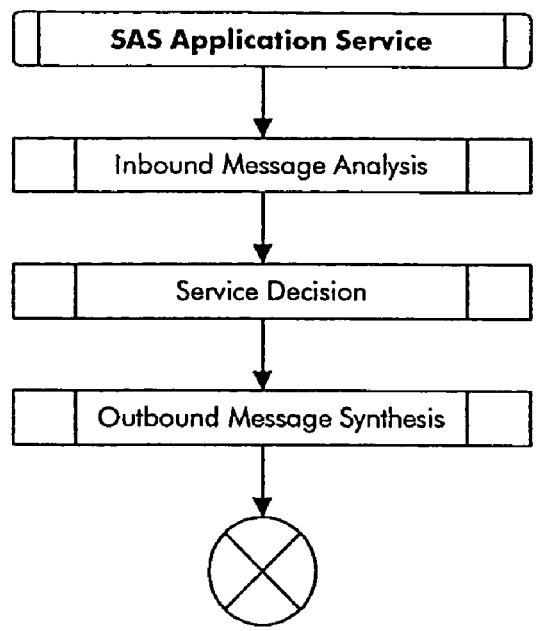
FIG. 3 shows the Generic Structure of a SAS Application Service.

FIG. 3 depicts the SDL diagram of the Generic Structure of a SAS Application Service.

The Inbound Message Analysis is quite generic for many SAS Application Services.

The Service Decision Stage is also quite generic. The Service Decision Stage accesses the SAS Database Pool. The capabilities of the SAS Database Pool are: SAS Number Portability and Flexible Routing. Additional types of database are of course possible.

Outbound Message Synthesis is very service specific. The general structure of this stage is described below.

2.1 Service Decision

Figure 4:
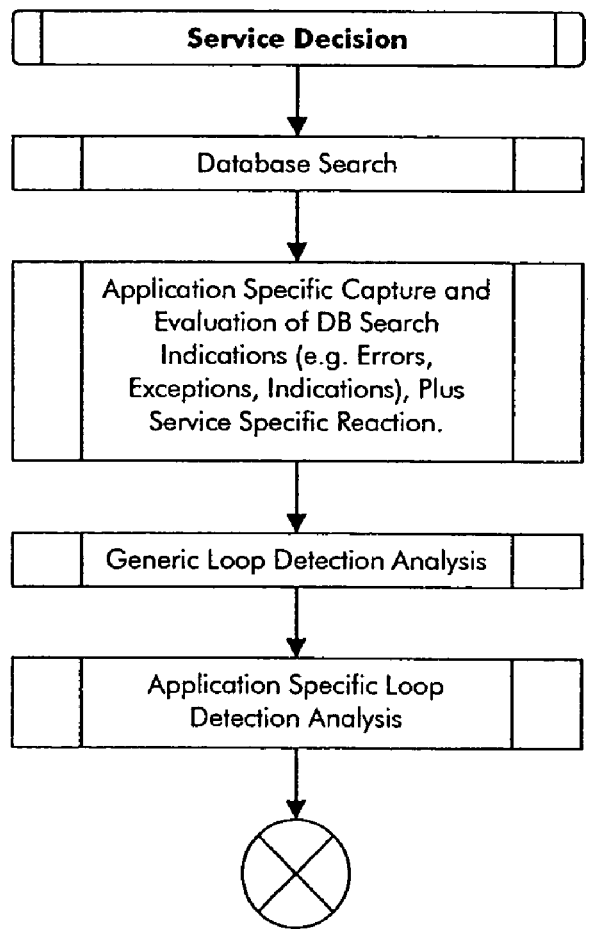
FIG. 4 shows the Service Decision part of the SAS Application Service.

For those SAS Application Services that are required to search the E.164 or MSIN Based Tables for routing information, the following principles apply. The search of the E.164 or MSIN Based Tables constitutes the main service decision. FIG. 4 depicts the SDL diagram of the Service Decision.

The Evaluation of Database Search Indications is a SAS Application Service specific matter, also the decision whether or not to perform another SAS Database search. The Application Specific Evaluation of DB Search Indications includes for instance actions like requesting additional digits in case the database search came back with an indication that the queried number was AMBIGUOUS. Both, the application specific evaluations and the decision for further database searches, depend on the SAS Application Service's service logic, configurable items such as "Open/Closed Numbering Plan", "Block/Single Number Dialling", "Request More Digits Yes/No", and other things. Table 6 contains a list of possible results of the database searches including options for corresponding reaction.

Loop Detection is a mechanism to discover inconsistencies in the received data, which might be caused by a condition that causes the SS7 message to loop through the SS7 network. There are two kinds of loop detection: a generic one and an application specific one. The generic one is specified in detail here. The applications specific ones are specified at the respective SAS Application Services.

2.1.1 Database Search

Figure 5:
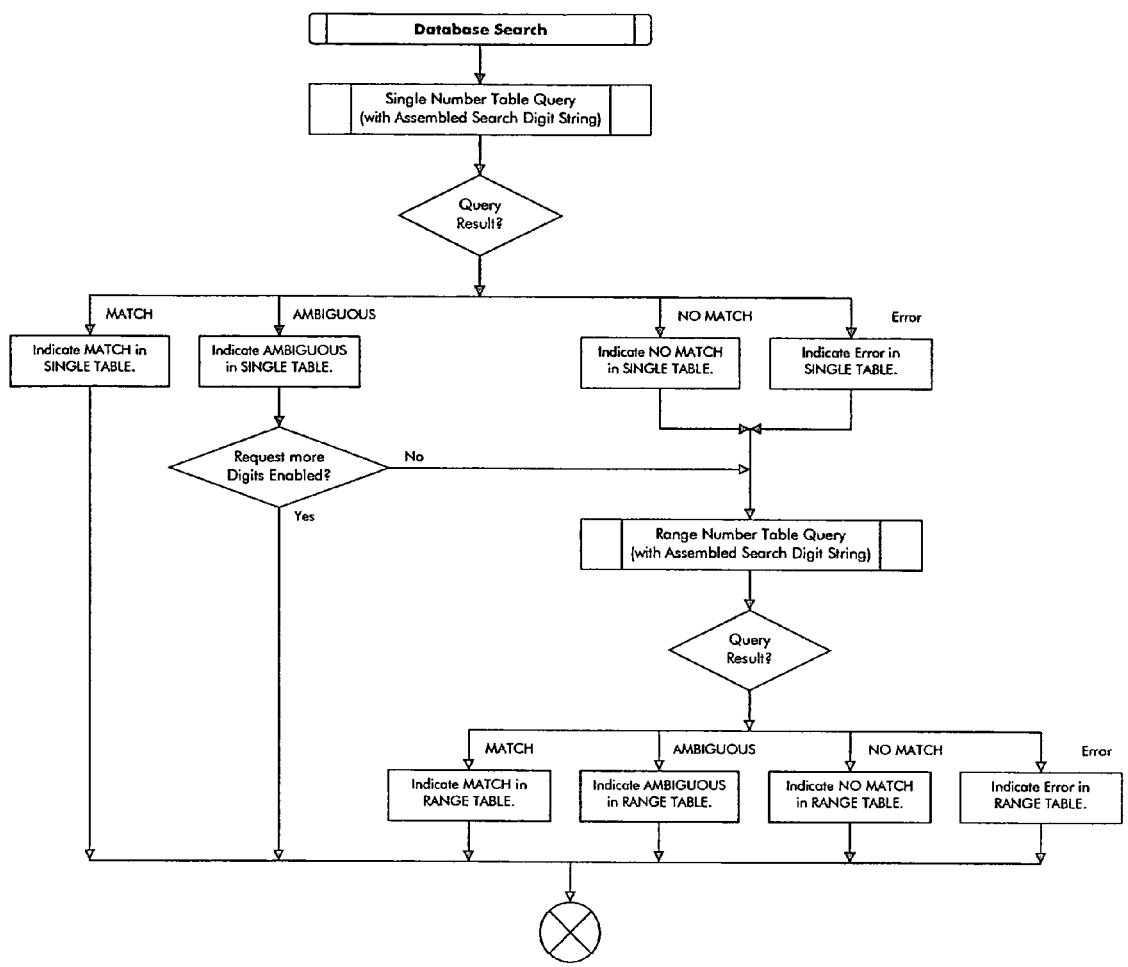
FIG. 5 shows a flowchart of the Database Search part of the Service Decision part.

FIG. 5 depicts the SDL diagram of the Database Search in E.164 and MSIN Based Databases.

FIG. 5 shows a Database Search in E.164 and MSIN Based Single Number and Range Number Tables.

A Single Number or Range Number Table is considered available when there are entries allocated for this table. A table is considered not available when there are no entries allocated for the table.

If the Single Number Table is available, then the Single Number Table shall be searched prior to the Range Number Table, if available.

If the Single Number Table is not available, then the Range Number Table shall be searched, if available.

If the Single Number Table search indicates NO MATCH or ERROR, then the Range Number Table shall be searched, if available.

Note: It is up to the individual SAS Application Service to define the routing for when the Single Number Table search result indicates NO MATCH or ERROR.

If the Single Number Table search indicates a MATCH then the Single Number Table search result shall indicate MATCH.

Note: It is up to the individual SAS Application Service to define the routing for when the Single Number Table search result indicates MATCH.

If the Single Number Table is to be searched and the search indicates a partial match (ambiguity), then the Single Number Table search result shall indicate AMBIGUOUS.

Note: It is up to the individual SAS Application Service to define the routing for when the Single Number Table search result indicates AMBIGUOUS.

If the Range Number Table is to be searched and the Range Number Table is not available, the Range Number Table search result shall indicate NO MATCH.

Note: It is up to the individual SAS Application Service to define the routing for when the Range Number Table search result indicates NO MATCH.

If the Range Number Table is to be searched and the search indicates NO MATCH or ERROR, the Range Number Table search result shall indicate NO MATCH or ERROR.

Note: It is up to the individual SAS Application Service to define the routing for when the Range Number Table search result indicates NO MATCH or ERROR.

If the Range Number Table is to be searched and the search indicates a partial match (ambiguity), then the Range Number Table search result shall indicate AMBIGUOUS.

Note: It is up to the individual SAS Application Service to define the routing for when the Range Number Table search result indicates AMBIGUOUS. In general, if Requesting of More Digits is not enabled, then AMBIGUOUS is mapped to NO MATCH, otherwise more digits are requested.

The Database Search is done in the Single Number and Range Number tables. The Single Number and Range Number tables refer to the Service Control Data Table. Below are three example tables for the example above as follows:

Table 1 presents the E.164 Single Number Table.

Table 2 presents the E.164 Range Number Table.

Table 3 presents the Service Control Data Table referenced by the two previous tables.

Please Note, that for space reasons, only three Service Control Data Slots instead of five are presented in the tables.

TABLE 1

E.164 Single Number Table for the Example.
E.164 Single Number Table

| E.164 Number Length | E.164 Number Value | Number Type | Portability Status | Default/ Exception Indicator | Transition Indicator | Extended Match Indicator | Extended Match Length | Service Control Data Slot-0 | Service Control Data Slot-1 | Service Control Data Slot-2 |
|---|---|---|---|---|---|---|---|---|---|---|
| 9 | 851230001 | MSISDN | ONPO | Exception | Over | Exact | 0 | SCDI-2 | — | — |
| 9 | 851230002 | MSISDN | ONPO | Exception | Not Over | Exact | 0 | SCDI-2 | — | — |
| 9 | 851230003 | MSISDN | ONPO | Exception | Over | Exact | 0 | SCDI-3 | | |
| 9 | 861230004 | MSISDN | ONPO | Exception | Not Over | Exact | 0 | SCDI-3 | | |
| 9 | 861230001 | MSISDN | FNPI | Exception | Over | Exact | 0 | SCDI-1 | SCDI-4 | — |
| 9 | 871230002 | MSISDN | FNPI | Exception | Not Over | Exact | 0 | SCDI-1 | SCDI-4 | — |
| 9 | 871230001 | MSISDN | FNPI | Exception | Over | Exact | 0 | SCDI-1 | SCDI-4 | — |
| 9 | 861230002 | MSISDN | FNPI | Exception | Not Over | Exact | 0 | SCDI-1 | SCDI-4 | — |
| 9 | 861230003 | MSISDN | FNP2AFN | Exception | Over | Exact | 0 | SCDI-3 | — | — |
| 9 | 861230004 | MSISDN | FNP2AFN | Exception | Not Over | Exact | 0 | SCDI-3 | — | — |
| 9 | 871230003 | MSISDN | FNP2AFN | Exception | Over | Exact | 0 | SCDI-2 | — | — |
| 9 | 871230004 | MSISDN | FNP2AFN | Exception | Not Over | Exact | 0 | SCDI-2 | — | — |

The acronyms for the Portability Status areas follows:

ONNPO: Own Number Not Ported Out

ONPO: Own Number Ported Out.

FNPI: Foreign Number Ported In.

FNP2AFN: Foreign Number Ported To Another Foreign Network.

FNNK2BP: Foreign Number Not Known To Be Ported.

TABLE 2

E.164 Range Number Table for the Example.
E.164 Range Number Table

| E.164 Number Start Range Length | E.164 Number Start Range Value | E.164 Number End Range Length | E.164 Number End Range Value | Number Type | Portability Status | Default/ Exception Indicator | Transition Indicator | Single Number Flag | Service Control Data Slot-0 | Single Control Data Slot-1 | Single Control Data Slot-2 |
|---|---|---|---|---|---|---|---|---|---|---|---|
| 9 | 850000000 | 9 | 859999999 | MSISDN | ONNPO | Default | Over | Range | SCDI-1 | SCD1-4 | — |
| 9 | 860000000 | 9 | 869999999 | MSISDN | FNNK2BP | Default | Over | Range | SCDI-2 | — | — |
| 9 | 870000000 | 9 | 879999999 | MSISDN | FNNK2BP | Default | Over | Range | SCDI-3 | — | — |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

TABLE 3

Service Control Data Table for the Example.
Service Control Data Table

| Service Control Data Id | Service Control Data Function | Service Control Data Type | Service Control Data Length | Service Control Data Value | Address Info Present Mask | NoAI | Numbering Plan | Cut Enable Mask | Cut Offset | Cut Length |
|---|---|---|---|---|---|---|---|---|---|---|
| SCDI-1 | Insert | INRN | 5 | 17685 | Not Present | NULL | NULL | Disabled | NULL | NULL |
| CDI-2 | Insert | INRN | 5 | 17686 | Not Present | NULL | NULL | Disabled | NULL | NULL |
| CDI-3 | Insert | INRN | 5 | 17687 | Not Present | NULL | NULL | Disabled | NULL | NULL |
| CDI-4 | Replace | HLR-SCA | 12 | 353857000420 | Present | International | 164 | Disabled | NULL | NULL |

The Service Control Slots in the Single Number and Range Number tables are for a given configuration always filled with the same type of Service Control Data.

This is illustrated for our example in Table 4.

TABLE 4

Auxiliary Number Table for the Example
Service Control Slots Configuration Table

| SAS Database Id | SAS Database Table Id | Service Control Slot Id | Service Control Type |
|---|---|---|---|
| MNP E.164 Database 0 | E.164 Single Number Table | 0 | INRN |
| MNP E.164 Database 0 | E.164 Single Number Table | 1 | HLR-SCA |
| MNP E.164 Database 0 | E.164 Single Number Table | 2 | — |
| MNP E.164 Database 0 | E.164 Single Number Table | 3 | — |
| MNP E.164 Database 0 | E.164 Single Number Table | 4 | — |
| MNP E.164 Database 0 | E.164 Range Number Table | 0 | INRN |
| MNP E.164 Database 0 | E.164 Range Number Table | 1 | HLR-SCA |
| MNP E.164 Database 0 | E.164 Range Number Table | 2 | — |
| MNP E.164 Database 0 | E.164 Range Number Table | 3 | — |
| MNP E.164 Database 0 | E.164 Range Number Table | 4 | — |

2.1.2 Detection of Loops and other Inconsistencies

Loop detection is provided to prevent signalling loops within the signalling network. Signalling loops may occur when the routing databases in different signalling networks contain inconsistent routing information for network subscribers. The ability to detect signalling loops is defined within the scope of each SAS Application Service and may not be present in all SAS Application Services. Also, the response taken to the detection of a signalling loop is defined within the scope of each SAS Application Service.

As stated above, there is a Generic Loop Detection mechanism, which applies to many SAS Application Service, and there are SAS Application Service specific Loop Detection mechanisms. The Generic Loop Detection mechanism is in detail specified here. The SAS Application Service specific Loop Detection mechanisms are outlined here and are specified at the respective SAS Application Service.

2.1.2.1 Generic Loop Detection Analysis

The generic mechanism for the detection of signalling loops is a two step process and requires the co-operation of the underlying switched network in order to succeed. First, the underlying switched network will pass any received Inter-Network Routing Number to the SAS as part of the concerned address (i.e. the SCCP Called Party Address GTAI). This first step signals the SAS Loop Detection algorithm that the signalling message has originated outside of the current signalling network. Secondly, the E.164 database(s) search must resolve to a combination of the pair (E.164 Number Type, Portability Status) that is marked as a candidate for looping. With these two criteria met, the signalling loop is detected.

This implies, that there has to be configuration table which indicates for each pair (E.164 Number Type, Portability Status), whether loop detection is to be enabled or not.

As a temporary relaxation of the SAS Loop Detection, the Transition Time capability was introduced. This provides a synchronisation period for recent database updates. If the Transition Indicator is marked "Transition Time is not yet over", then the SAS Loop Detection is either bypassed or relaxed.

Figure 6:
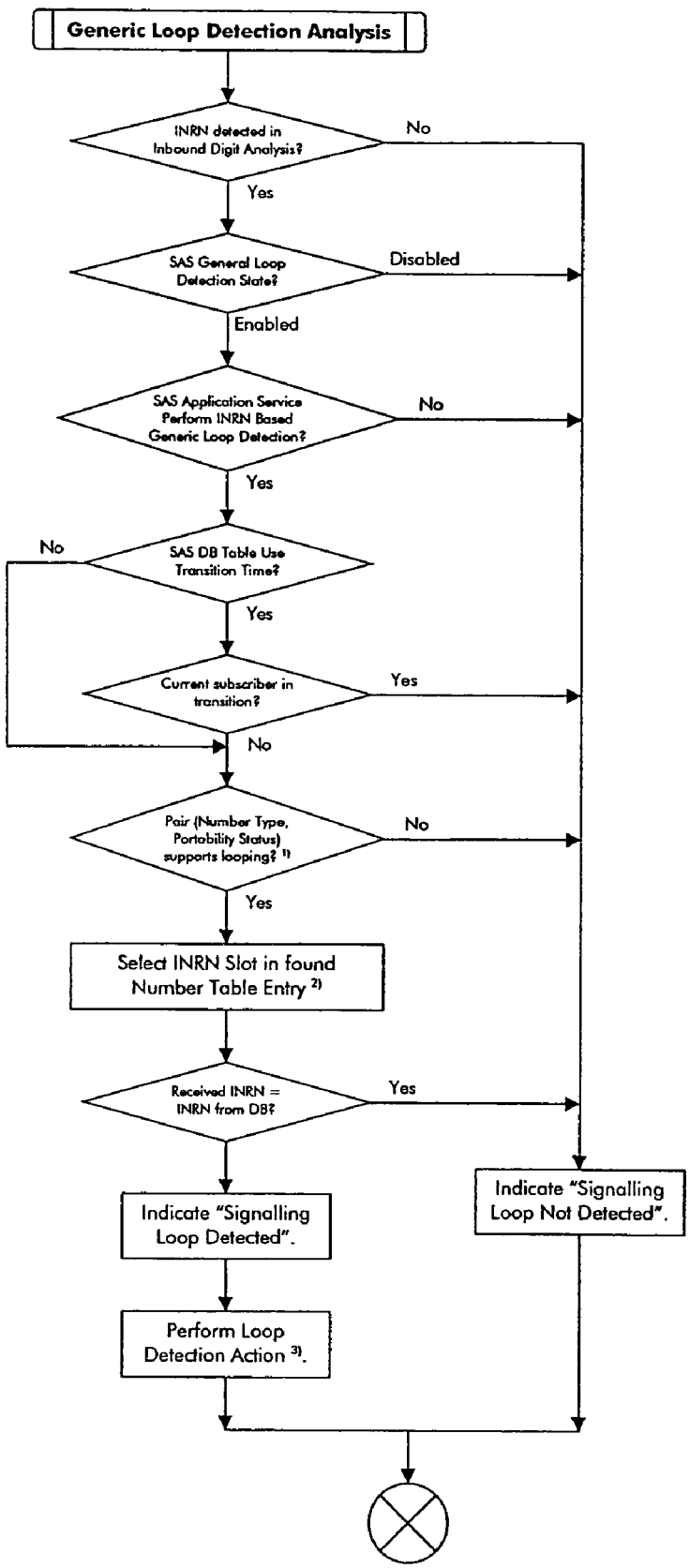
FIG. 6 shows a flowchart of the Generic Loop Detection part of the Service Decision part.

FIG. 6 depicts the SDL diagram of the Generic Loop Detection Analysis.

If an INRN is not present in the Input Digit String, then a signalling loop shall not be detected.

If an INRN is present in the Input Digit String, then a signalling loop shall be detected.

If the SAS General Loop Detection State is configured disabled, then a signalling loop shall not be detected.

If the SAS General Loop Detection State is configured enabled, then a signalling loop shall be detected.

If the SAS Application Service does not perform INRN Based Generic Loop Detection, then a signalling loop shall not be detected.

INRN found in the SAS database, then a signalling loop shall be detected, plus a configured loop detection action has to be performed.

The Generic Loop Detection makes use of the Loop Detection Status and Action Configuration Table. Table 5 shows possible values for our example.

Note: the current implementation of Loop Detection executes only if the Outbound Processing Configuration Data entry refers to a Service Control Slot, which contains an INRN.

TABLE 5

Loop Detection Status And Action Configuration Table for the Example.
Loop Detection Status And Action Configuration Table

| Application Service Id | SAS Database Id | SAS Database Table Id | Number Type | Portability Status | Detection State And Action |
|---|---|---|---|---|---|
| MNP-INAP-O-VM-IW | MNP E.164 Database 0 | E.164 Single Number Table | MSISDN | ONNPO | Disabled |
| MNP-INAP-O-VM-IW | MNP E.164 Database 0 | E.164 Single Number Table | MSISDN | ONPO | Discard, Counter |
| MNP-INAP-O-VM-IW | MNP E.164 Database 0 | E.164 Single Number Table | MSISDN | FNPI | Discard, Counter |
| MNP-INAP-O-VM-IW | MNP E.164 Database 0 | E.164 Single Number Table | MSISDN | FNP2AFN | Discard, Counter |
| MNP-INAP-O-VM-IW | MNP E.164 Database 0 | E.164 Single Number Table | MSISDN | FNNK2BP | Disabled |
| MNP-INAP-O-VM-IW | MNP E.164 Database 0 | E.164 Range Number Table | MSISDN | ONNPO | Discard, Counter |
| MNP-INAP-O-VM-IW | MNP E.164 Database 0 | E.164 Range Number Table | MSISDN | ONPO | Disabled |
| MNP-INAP-O-VM-IW | MNP E.164 Database 0 | E.164 Range Number Table | MSISDN | FNPI | Disabled |
| MNP-INAP-O-VM-IW | MNP E.164 Database 0 | E.164 Range Number Table | MSISDN | FNP2AFN | Disabled |
| MNP-INAP-O-VM-IW | MNP E.164 Database 0 | E.164 Range Number Table | MSISDN | FNNK2BP | Discard, Counter |

The acronyms for the Portability Status are as follows:
ONNPO: Own Number Not Ported Out
ONPO: Own Number Ported Out.
FNPI: Foreign Number Ported In.
FNP2AFN: Foreign Number Ported To Another Foreign Network.
FNNK2BP: Foreign Number Not Known To Be Ported.

If the SAS Application Service performs INRN Based Generic Loop Detection, then a signalling loop shall be detected.

If the SAS Database Table uses Transition Time, then the current value of the Transition Indicator shall be queried in the entry found in the Single Number or Range Number table.

If the SAS Database Table does not use Transition Time, then a signalling loop shall be detected.

If the Transition Indicator of the entry found in the Single Number or Range Number table indicates that the subscriber is in transition, then a signalling loop shall not be detected.

If the Transition Indicator of the entry found in the Single Number or Range Number table indicates that the subscriber is not in transition, then a signalling loop shall be detected.

If the database search criteria do not indicate a MATCH, then a signalling loop shall not be detected.

If the database search criteria indicate a MATCH, then a signalling loop shall be detected.

If the pair (Number Type, Portability Status) of the entry found in the Single Number or Range Number table does not support looping, then a signalling loop shall not be detected.

If the pair (Number Type, Portability Status) of the entry found in the Single Number or Range Number table supports looping, then a signalling loop shall be detected.

If an Inter-Network Routing Number was received in the concerned address, and the received INRN is equal to the INRN found in the SAS database, then a signalling loop shall not be detected.

If an Inter-Network Routing Number was received in the concerned address, and the received INRN is not equal to the 2.1.2.2 Outline of SAS Application Service Specific Loop Detection Mechanisms SAS Application Service Specific Loop Detection and detection of inconsistencies can be performed on the following principles (as soon as the principles are more precisely defined, respective configuration data items are introduced):

If the network in which the A5070 SSE is located, can never be the transit network in a Number Portability scenario, then the received INRN must always be an own INRN:

Reception of an INRN, which is not an own INRN, results in a detected loop.

There has to be a configuration data item "Own INRNs", which specifies the list of the operator's own INRNs.

Further checks on the received INRN are possible depending of other particular network conditions.

Loop Detection is dependent on the Routing Principle in the network of the operator and in the portability domain:

All networks in the portability domain implement the same routing mechanism. Four cases have to be distinguished:

Direct Routing.

Indirect Routing.

Indirect Routing with Reference to the Subscription Network.

One of above three options as special value for each Natl range in the portability domain.

Each network in the portability domain defines its own routing mechanism for number portability traffic. In this case, only the routing mechanism of the own network is known:

error/exception/indication item together with its origin, the location where it has to be treated and a comment. The comment concentrates on the action to be done in the location where the respective item has to be treated.

TABLE 6

Table of Errors, Exceptions and Indications of the Database Search and the Generic Loop Detection Analysis.
Table of Errors, Exceptions and Indications of the Database Search and the Generic Loop Detection Analysis

| Error/Exception/Indication Name | Origin | Location where Error/Exception/Indication has to be handled | Comment |
|---|---|---|---|
| Indication: "MATCH in Single Table." | Database Search | SAS Application Service. | Possible reactions of SAS Application Service: depending depending on the configurations items: Continue with Generic Loop Detection Analysis. Continue with Outbound Message Synthesis. |
| Indication: "AMBIGUOUS in Single Table | Database Search | SAS Application Service. | Possible reactions of SAS Application Service: depending depending on the configuration items: Request more digits and start with the new string of digits again at Inbound Message Analysis. Interpret AMBIGUOUS as NO MATCH and continue with the respective behaviour. |
| Indication: "NO MATCH in Single Table | Database Search | SAS Application Service. | Possible reactions of SAS Application Service: depending depending on the configuration items: Continue with Range Number Table query. Continue with Outbound Message Synthesis. |
| Indication: "Error in Single Table | Database Search | SAS Application Service. | Possible reactions of SAS Application Service: depending on configuration items: Continue with Range Number Table query. Continue with Outbound Message Synthesis. |
| Indication: "MATCH in Range Table." | Database Search | SAS Application Service. | Possible reactions of SAS Application Service: depending depending on the configuration items:: Continue with Generic Loop Detection Analysis. Continue with Outbound Message Synthesis. |
| Indication: "AMBIGUOUS is Range Table." | Database Search | SAS Application Service. | Possible reactions of SAS Application Service: depending depending on the configuration items: Request more digits and start with the new string of digits again at Inbound Message Analysis. Interpret AMBIGUOUS as NO MATCH and continue with the respective behaviour. |
| Indication: "NO MATCH in Range Table." | Database Search | SAS Application Service. | Possible reactions of SAS Application Service: Continue with Outbound Message Synthesis. |
| Indication: "Error in Range Table". | Database Search | SAS Application Service. | Possible reactions of SAS Application Service: Continue with Outbound Message Synthesis. |
| Indication: "Signalling Loop Detected." | Generic Loop Detection Analysis | SAS Application Service. | Possible reactions of SAS Application Service: Continue with configurated Loop Detection Action. |
| Indication: "Signalling Loop Not Detecteded." | Generic Loop Detection Analysis | SAS Application Service. | Possible reactions of SAS Application Service: Continue with Application Specific Loop Detection Analysis. |

Direct Routing.
Indirect Routing.
Indirect Routing with Reference to the Subscription Network.
One of above three options as special value for each Nat1 range in the portability domain.

Whether or not the routing applies to all numbers or to specific Nat1 ranges, the actual relevant information for loop detection is always one of the three values "Direct Routing", "Indirect Routing", or "Indirect Routing with Reference to the Subscription Network".

Figure 7:
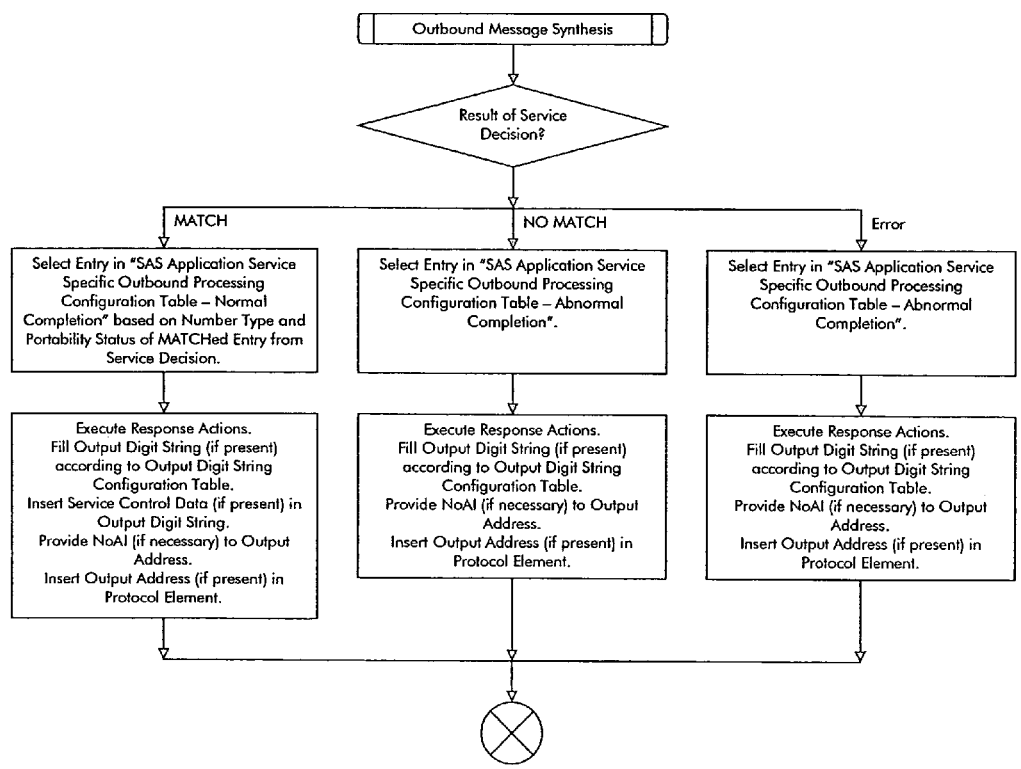
FIG. 7 shows a flowchart of the Outbound Message Synthesis part of the SAS Application Service.

2.1.3 Errors, Exceptions and Indications of the Database Search and the Generic Loop Detection Analysis Table 6 lists all errors, exceptions, and indications, which can be generated during Database Search and Generic Loop Detection Analysis. Each table entry contains the respective 2.2 Outbound Message Synthesis From all three stages, Outbound Message Synthesis is the one, which has the most application specific properties. However, there are configuration data items, which occur for each SAS Application Service. In general, Outbound Message Synthesis takes the result of Stage 2—Service Decision—and constructs the outbound response message. FIG. 7 specifies the generic aspects of the Outbound Message Synthesis.

Configuration tables control Outbound Message Synthesis. The configuration tables of the Outbound Message Synthesis are illustrated by an example. The SAS Application Service is the same as the one used above: MNP-INAP With Optional Voice Mail Inter-working.

An Output Address includes the triple (NoA1, Numbering Plan, Digit String). The Output Digit String Configuration Table specifies the necessary output digit strings of the SAS Application Service, including a NoA1 value. The value for Numbering Plan is implicitly present in the service logic of the SAS Application Service. Memory has to be allocated for the digit string elements of the Output Digit String Configuration Table, plus for Nat1 and Nat2 or Nat.

TABLE 7

Definition of the Output Digit String Configuration Table for the Example.
Output Digit String Configuration Table

| SAS Application Service Id | Output Digit String Id | Auxiliary Number Name | Nature of Address Indicator | Auxiliary Number Presence | Auxiliary Number Position |
|---|---|---|---|---|---|
| MNP-INAP-O-VM-IW | 1 | INRN | Subscriber | Modified Input | Prefix-0 |
| MNP-INAP-O-VM-IW | 1 | Nat1 | Subscriber | Copy Input | Nat1 |
| MNP-INAP-O-VM-IW | 1 | VMSC-INI | Subscriber | Copy Input | Infix-0 |
| MNP-INAP-O-VM-IW | 1 | Nat2 | Subscriber | Copy Input | Nat2 |

TABLE 8

Output Digit String To Protocol Element Mapping Table for Table 7.
Output Digit String To Protocol Element Mapping Table

| SAS Application Service Id | Output Digit String Id | Protocol Element Id | Output Digit String Option |
|---|---|---|---|
| MNP-INAP-O-VM-IW | 1 | INAP Connect DRA | 1 |

TABLE 9

Output Digit String To Protocol Element Mapping Table for Table 7.
Input Digit String To Output Digit String Mapping Table

| SAS Application Service Id | Output Digit String Id | Input Digit String Id |
|---|---|---|
| MNP-INAP-O-VM-IW | 1 | 1 |
| MNP-INAP-O-VM-IW | 1 | 2 |
| MNP-INAP-O-VM-IW | 1 | 3 |
| MNP-INAP-O-VM-IW | 1 | 4 |

The SAS Application Service Specific Outbound Processing Configuration Table for Normal and Abnormal Completion contains up to 10 Response Actions. One or more of these Response Actions can be used to insert configured values at defined positions in the output digit string.

TABLE 10

Definition of the SAS Application Service Specific Outbound Processing Configuration Table for the Example - Normal Completion.
SAS Application Service Specific Outbound Processing Configuration Table - Normal Completion

| SAS Application Service Id | Number Type | Portability Status | Reesponse Action Id1 | Service Control Data Slot Id | Output Digit String Id | Nature of Address Indicator |
|---|---|---|---|---|---|---|
| MNP-INAP-O-VM-IW | MSISDN | ONNPO | Send INAP Continue Operation | None. | None. | NULL |
| MNP-INAP-O-VM-IW | MSISDN | ONPO | Send INAP Connect Operation | 0 [INRN] | 1 | Subscriber |
| MNP-INAP-O-VM-IW | MSISDN | FNPI | Send INAP Connect Operation | 0 [INRN] | 1 | Subscriber |
| MNP-INAP-O-VM-IW | MSISDN | FNP2AFN | Send INAP Connect Operation | 0 [INRN] | 1 | Subscriber |
| MNP-INAP-O-VM-IW | MSISDN | FNNK2BP | Send INAP Connect Operation | 0 [INRN] | 1 | Subscriber |

The acronyms for the Portability Status are as follows:

ONNPO: Own Number Not Ported Out

ONPO: Own Number Ported Out.

FNPI: Foreign Number Ported In.

FNP2AFN: Foreign Number Ported To Another Foreign Network.

FNNK2BP: Foreign Number Not Known To Be Ported.

TABLE 11

Definition of the SAS Application Service Specific Outbound Processing
Configuration Table for the Example - Abnormal Completion.
SAS Application Service Specific Outbound Processing Configuration Table - Abnormal Completion

| SAS Application Service Id | SAS Application Specific Abnormal Condition Id | Response Action Id1 | Response Action 1d2 | Output Digit String Id | Nature of Address Indicator |
|---|---|---|---|---|---|
| MNP-INAP-O-VM-IW | NO MATCH | Send INAP Continue Operation | None. | None. | NULL |
| MNP-INAP-O-VM-IW | Error1 | Send INAP Release Call Operation | Release Call Cause n | None. | NULL |

2.2.1 Generic Outbound Actions

This sub-chapter specifies Outbound Actions, which can be used by multiple SAS Application Services.

Each set of Outbound Actions is triggered by a value pair (Number Type, Portability Status) of the Single Number or Range Number tables.

2.2.1.1 Digit Preparation in Outbound Digit String

The generic outbound action "Digit Preparation in Outbound Digit String" manipulates the output digit string or a part of it according to the specification in Table 18.

3. Configuration of Loop Detection and Outbound Message Synthesis Configuration Items for Loop Detection:

There shall be a configuration data item "Perform INRN Based Generic Loop Detection" with the possible values YES and NO. Perform INRN Based Generic Loop Detection indicates whether or not the INRN Based Generic Loop Detection shall be used in the loop detection algorithm within the Service Decision phase of the respective SAS Application Service.

The received INRN might indicate a loop if it is not identical to the INRN found as a result of the query against the Single Number table and Range Number table.

The name of this configuration data item is

SasApplicationServicePerform-
InrnBasedGenericLoopDetection. The syntax is:

SasApplicationServicePerformlnrnBasedGenericLoop
Detection=SasApplicationServiceId, InputDigitStringId, PerformlnrnBasedGenericLoopDetection.

SasApplicationServiceId is any SAS Application Service Id.

InputDigitStringId is any Input Digit String Id.

PerforminrnBasedGenericLoopDetection is an enumerated data type with values YES and NO.

There shall be a configuration data item "Slot Id of INRN" with a valid Service Control Data Slot Id as value. "Slot Id of INRN" identifies the Service Control Data Slot in the found entry of the Single Number or Range Number table from which the INRN has to be retrieved in order to compare the found INRN with the received INRN within INRN based Loop Detection.

The received INRN might indicate a loop if it is not identical to the INRN found as a result of the query against the Single Number table and Range Number table.

The name of this configuration data item is SasApplicationServiceSlotIdOfInrn. The syntax is:

SasApplicationServiceSlotIdOfInrn=SasAppliationServiceId, SlotIdOfInrn.

SasApplicationServiceId is any SAS Application Service Id.

SlotIdOfInrn is a valid encoding of Service Control Data Slot Id.

There may be additional other types of loop detection or detection of various kinds of inconsistent data in the input digit strings, which might be enabled or disabled for a specific SAS Application Service in the same way, depending on the respective configuration data item. As soon as they are precisely defined additional configuration data items will be introduced.

There shall be a configuration table, which configures whether loop detection is enabled or disabled depending on each allowed value pair (E.164 Number Type, Portability Status) or (MSIN Number Type, Portability Status) of the respective single number or range number table. If Loop Detection is enabled, then an action has to be defined, which specifies what has to be done with the looping SS7 message.

TABLE 12

Details of the Loop Detection Status Configuration Table
Loop Detection Status And Action Configuration Table

| Attribute | Format | Values | Description |
|---|---|---|---|
| SAS Application Service Id | 2 Byte | Any valid SAS Application Service Id | Primary Key. |
| SAS Database Id | 2 Byte | Any valid SAS Database Id | Primary Key. |
| SAS Database Table Id | 2 Byte | Any valid SAS Database Table Id | Primary Key. |
| Number Type | 1 Byte | Any valid encoding of Number Type | Primary Key. |
| Portability Status | 1 Byte | Any valid encoding of Portability Status | Primary Key. |
| Loop Detection State and Action | 1 Byte | Any valid encoding of Loop Detection State and Action | Possible values are "Disabled", "Enabled: Discard Message", etc. |

There shall be a configuration data item "Use Transition Time" with the possible values YES and NO. Use Transition Time indicates whether or not the Transition Indicator of the single number or range number tables shall be used in the loop detection algorithm within the Service Decision phase of the respective SAS Application Service.

The name of this configuration data item is SasDbTableUseTransitionTime. The syntax is:

SasDbTableUseTransitionTime=SasDbTableId, UseTransitionTime.

SasDbTableId is any SAS Database Table Id (details to be defined).

UseTransitionTime is an enumerated data type with values YES and NO.

Configuration Items for Outbound Digits Synthesis:

Each SAS Application Service shall have a configuration data item, which specifies the structure of each possible output digit string on the basis of its general abstract structure. Each output digit string is associated to a protocol parameter to which it is sent. It is even possible to associate more than one output digit string to a given protocol parameter. The structure of the output digit string is specified by the list of its auxiliary numbers. The following information shall be specified for each output digit string. Table 13 presents the information necessary to specify an input digit string. Table 14 specifies the mapping between the Input Digit String to the Output Digit String. Table 15 specifies the mapping between the Output Digit String and the Protocol Element.

TABLE 13

Details of the Output Digit String Configuration Table
Output Digit String Configuration Table

| Attribute | Format | Values | Description |
| --- | --- | --- | --- |
| SAS Application Service Id | 2 Byte | Any valid SAS Application Service Id | Primary Key. |
| Output Digit String Id | 3 Byte | Any valid Input Digit String Id | Primary Key. SAS Application Service specific encoding. Multiple output digit per Protocol Element are possible. If multiple output digit strings are specified, then usage of each output digit string may be associated with a specific condition. It is a matter of of the SAS Application Service how the association of a condition is mapped to a specific output digit string. |
| Auxiliary Number Name | 1 Byte | Any valid encoding of Service Control Data Type. E.g. SI, CC, INRN, OwnINRN, VMSC-INP, SMSC-INP, VMSC-INI, SMSC-INI, P, MCC, MNC, NC, GAC, EC, Nat1, NDC, Nat2, SN, BigCore, NotAllowed, Opaque. | Primary Key. An output digit string is defined by the explicit list of its Head parts, the BigCore and its Tail parts, identified by the respective names listed in the encoding of the common mnemonics encoding of the Service Control Data Type and the Auxiliary Number Name. It is possible in the Output Digit String, that any part from the Input Digit String can be explicitly manipulated by the service logic. The various types of Auxiliary Numbers and Core Part Number - identified by their Name - have the following structure (as far as known today): CC: 1–3 hex digits. All others have 1 or more hex digits, depending on the customer's network. A particular meaning has the following value: NotAllowed: If an Auxiliary Number has this name, then the respective Output Digit String for a particular NoAI value is not allowed. The Auxiliary Number Presence is Always in this case, and the Auxiliary Number Position is Head-0. The Output Digit String must include this Auxiliary Item only. Opaque: If an Auxiliary Number has this name, then the respective Output Digit String for a particular NoAI value will include a value derived from Service Control Data Table as a replacement value. No structure of the Output Digit String needs to be known in this case. The Output Digit String must include this Auxiliary Item only, in position Head-0. The value. "NotAllowed" is necessary, even in the combination with the Allowed of NoAI Configuration Table. Reason: there may be more than one option of output digit string for a given NoAI value, and in each option the allowed digit strings for a given NoAI value differ. Purpose of this parameter for the service logic of the SAS Application Service: This unique name is used to define each entity in the outbound digit string. The relationship between corresponding entities in the input digit string and the output digit string is defined on the basis of the Auxiliary Number Name. |
| Global Title Indicator | 1 Byte | 00 h: No Global Title (GT) included in address. 01 h: GT in Address includes only No AI. 02 h: GT includes only TT. 03 h: GT includes TT, NP, ES. 04 h: GT includes TT, NP, ES, NoAI. 05–07 h: Spare International. 08–0E h : Spare National. 0F h: Reserved for extension. 10–13 h: : Internal Spare. 14 h: GTI = 1 or 4. 15 h: Internal Spare. 23 h: GTI = 2 or 3. 24–FD h: Internal Spare. FE h: Copy GTI from Input Digit String. FF h: GTI is not used | This attribute is used in order to specify Input Digit Strings also dependent on the GTI, in addition to the dependence on the NoAI. In SCCP Standard, the Global Title Indicator is represented as a 4 bit value. In this internal representation a 1 byte value is used in order to represent additional internal values: 14 h is used to specify that the actual receive GTI may either be 1 or 4. This makes sense as both have NoAI, and an operator may have chosen to define the same digit string structure for both values of GTI. 23 h is used to specify that the actual receive GTI may either be 2 or 3. This makes sense as both do not have NoAI, and an operator may have chosen to define the same digit string structure for both values of GTI. FE h: GTI may also be used in the Output Digit String. This value specifies, that the GTI shall be copied from the corresponding Input Digit String. FF h: The GTI is not used in all TCAP user addresses. |
| Nature of Address Indicator | 1 Byte | Any valid protocol specific encoding of the Nature of Address | A NoAI value may be associated with a structure definition of an output digit string. NoAI in protocols has up to 7 bit for its encoding. Therefore, the value FF h as NULL value for this attribute, |

TABLE 13-continued

Details of the Output Digit String Configuration Table
Output Digit String Configuration Table

| Attribute | Format | Values | Description |
|---|---|---|---|
| | | Indicator. | which means that no NoAI value is associated with this particular output digit string. |
| Translation Type Control | 1 Byte | Use, Do Not Use | This attribute indicates whether or not the Translation Type shall be used in the Specified Output Digit String. |
| Translation Type | 1 Byte | Any valid protocol specific encoding of the Translation Type | A Translation Type value may be associated with a structure definition of an digit string. |
| Auxiliary Number Presence | 1 Byte | Copy From Input, Modify Input With Service Control, Always as New Element From Service Control, Sometimes as New Element From Service Control, Always as New Element From Static Configuration. | The presence of the auxiliary number. For the output digit string, the semantics is as follows:<br>  Copy From Input: Copy from corresponding input digit string element. If the corresponding input digit string element was actually not present, this output digit string element is empty.<br>  Modify Input With Service Control: Modification of the corresponding input digit string element. The modification is controlled by the respective Service Control Data item in combination with the pair (Number Type, Portability Status) of the found entry in the Single Number or Range Number table.<br>  Always as New Element From Service Control: Always present as a new element, which was not yet present in the input digit string. The value is derived from the respective Service Control Data item, possibly in combination with the pair (Number Type, Portability Status) of the found entry in the Single Number or Range Number table. If an Auxiliary Number which is specified to be Always present as a mew element, is not actually present, an error has to be reported.<br>  Sometimes as New Element From Service Control: Sometimes present as a new element, which was not yet present in the input digit string. The value is derived from the respective Service Control Data item, possibly in possibly in combination with the pair (Number Type, Portability Status) of the found entry in the Single Number or Range Number table.<br>  Always as New Element From Static Configuration: Always present as a new element, which was not yet present in the input digit string. The value is derived from static configuration data for this particular SAS Application Service.<br>Purpose of this parameter for the service logic of the SAS Application Service: this attribute allows to generate an error, if an Always present optional digit string is not present in the output digit string. |
| Auxiliary Number Position | 1 Byte | Any valid encoding of Auxiliary Number Position. | Possible values are Head-0 to Prefix-31, and Tail-0 to Tail-31. Purpose of this parameter for the service logic of the SAS Application Service: specifies the correct position of this entity in the output digit strings. |

Note: An empty table for a given output digit string is not allowed, at least Opaque or something similar has to be specified.
Note: A SAS Application Service accesses an Output Digit String by means of the following four key attributes: SAS Application Service Id, Protocol Element Id, Input Digit String Id, Nature of Address Indicator. The key attribute Auxiliary Number Name does not need to be used as it specifies the respective Auxiliary Numbers in the output digit string.
Note: For each Input Digit String, which might be used in an Output Digit String, there has to be a dedicated definition of Output Digit String. It can be possible, that the one and the same structure of Output Digit String is defined for multiple Input Digit Strings.

TABLE 14

Details of the Input Digit String To Output Digit String Mapping Table
Input Digit String To Output Digit String Mapping Table

| Attribute | Format | Values | Description |
|---|---|---|---|
| SAS Application Service ID | 2 Byte | Any valid SAS Application Service Id | Primary Key. |
| Output Digit String Id | 3 Byte | Any valid Input Digit String Id | Primary Key. SAS Application Service specific encoding. Multiple output digit strings per Protocol Element are possible. If multiple output digit strings are specified, then usage of each output digit string may be associated with a specific condition. It is a matter of the SAS Application Service how the association of a condition is mapped to a specific output digit string. |
| Input Digit String Id | 3 Byte | Any valid Input Digit String Id | Foreign Key to the Input Digit String from which this Output Digit String is provided with values. SAS Application Service specific encoding. Only one Input Digit String per Output Digit String is possible. |

Note: the relationship between Input Digit String and Output Digit String is many-to-many.

TABLE 15

Details of the Input Digit String To Protocol Element Mapping Table
Output Digit String To Protocol Element Mapping Table

| Attribute | Format | Values | Description |
|---|---|---|---|
| SAS Aplication Service Id | 2 Byte | Any valid SAS Application Service Id | Primary Key. |
| Output Digit String Id | 3 Byte | Any valid Input Digit String Id | Primary Key. SAS Application Service specific encoding. Mutiple output digit strings per Protocol Element are possible. If multiple output digit strings are specified, then usage of each output digit string may be associated with a specific condition. It is a matter of the SAS Application Service how the association of a condition is mapped to a specific output digit string. |
| Protocol Element Id | 3 Bytes | Any valid Protocol Element Id | SAS Application Service specific encoding. A protocol element is for instance a parameter of a service primitive. For a given protocol element one or more output settings are possible. |
| Output Digit String Option | 1 Byte | Positive Integer | The sequence number of the Output Digit String Option. For each protocol element, it is possible to define multiple Output Digit Strings. |

A single output digit sting shall be able to be selected—based on its Id—from a set of possible output digit strings. The selection is done based on the value combination of (E.164/MSIN Number Type, Portability Status). A table has to be present to specify this configuration data.

It shall be possible to specify which Service Control Slot (i.e. Service Control Data Sequence Number) of the found entry in the single number or range number table is to be used in the outbound processing depending on the value combination of (E.164 Number Type, Portability Status). A table has to be present to specify this configuration data. The some principle can in the future be applied to other number parts as well.

It shall be possible to specify which action is to be done in the outbound digit processing depending on the value combination of (E.164 Number Type, Portability Status). Possible actions are the type of message to be used, etc. A table has to be present to specify this configuration data. The same principle can in the future be applied to other number parts as well.

TABLE 16

Details of the SAS Application Service Specific Outbound Processing
Configuration Table - Normal Completion
SAS Application Service Specific Outbound Processing Configuration Table -
Normal Completion

| Attribute | Format | Values | Description |
|---|---|---|---|
| SAS Application Service Id | 2 Byte | Any valid SAS Application Service Id | Primary Key. |
| Number Type | 1 Byte | Any valid encoding of Number Type | Primary Key. |
| Portability Status | 1 Byte | Any valid encoding of Portability Status | Primary Key. |
| Inbound NoAl Value | 2 Byte | Any valid encoding of NoAl plus FFFFh for ignoring this attribute. | Primary Key. Some SAS Application Services need to take the NoAl value of the Inbound Address into account to determine the Outbound Action. The NoAl value to be used here is the one of this Inbound Address for which the database search in the Service Decision phase was done. If this attribute is to be ignored during Outbound Processing, it has to be filled with FFFFh. |
| Response Action Id 1 | 3 Byte | Any valid Response Action | Encoding is SAS Application Service specific. NULL value is FFh. |
| Response Action Id 2 | 3 Byte | Any valid Response Action | Encoding is SAS Application Service specific. NULL value is FFh. |
| Response Action Id 3 | 3 Byte | Any valid Response Action | Encoding is SAS Application Service specific. NULL value is FFh. |
| Response Action Id 4 | 3 Byte | Any valid Response Action | Encoding is SAS Application Service specific. NULL value is FFh. |
| Response Action Id 5 | 3 Byte | Any valid Response Action | Encoding is SAS Application Service specific. NULL value is FFh. |
| Response Action Id 6 | 3 Byte | Any valid Response Action | Encoding is SAS Application Service specific. NULL value is FFh. |
| Response Action Id 7 | 3 Byte | Any valid Response Action | Encoding is SAS Application Service specific. NULL value is FFh. |
| Response Action Id 8 | 3 Byte | Any valid Response Action | Encoding is SAS Application Service specific. NULL value is FFh. |
| Response Action Id 9 | 3 Byte | Any valid Response Action | Encoding is SAS Application Service specific. NULL value is FFh. |
| Response Action Id 10 | 3 Byte | Any valid Response Action | Encoding is SAS Application Service specific. NULL value is FFh. |
| Service Control Data Slot Id | 1 Byte | Any valid encoding of Service Control Data Slot Id | |
| Output Digit String Id | 3 Byte | Any valid Input Digit String Id | Partial foreign key into the Structure of Output Digit String Configuration Table. SAS Application Service specific encoding. Multiple output digit strings per Protocol Element are possible. |

TABLE 16-continued

Details of the SAS Application Service Specific Outbound Processing
Configuration Table - Normal Completion
SAS Application Service Specific Outbound Processing Configuration Table -
Normal Completion

| Attribute | Format | Values | Description |
|---|---|---|---|
| Nature of Address Indicator | 1 Byte | Any valid protocol specific encoding of the Nature of Address Indicator. | Partial foreign key into the Structure of Output Digit String Configuration Table. NoAI in protocols has up to 7 bit for its encoding. Therefore, the value FFh is used as NULL value for this attribute. Per input digit string, the NoAI has to be considered. Therefore, per Input Digit String Id, multiple NoAIs are possible. For each NoAI of an Input Digit String Id, an input digit string has to be defined. |

Handling of NoAI values in the outbound processing: the NoAI value of the output digit string can be determined from the following four sources:
1. The input digit string corresponding to the output digit string,
2. The selected entry of the Service Control Data table,
3. The output digit string, or
4. The SAS Application Service Specific Outbound Processing Configuration Table - Normal Completion (this table).
The NoAI in this table overrules the other three. If the NoAI value in this table is NULL, then the NoAI value of the selected output digit string has to bu used. If the NoAI value of the selected output digit string is NULL, then the NoAI value of the selected entry of the Service Control Data Table has to be ussed. If this entry does not support a NoAI value, then NoAI value of the corresponding input digit string has to be used.

Table 16 Contains the application specific outbound processing in case an entry was found in the Single Number or Range Number Table. However, it is possible that no entry is found in both tables. This abnormal outbound processing is contained in Table 17.

TABLE 17

Details of the SAS Application Service Specific Outbound Processing
Configuration Table - Abnormal Completion
SAS Application Service Specific Outbound Processing Configuration Table -
Abnormal Completion

| Attribute | Format | Values | Description |
|---|---|---|---|
| SAS Application Service Id | 2 Byte | Any valid SAS Application Service Id | Primary Key. |
| SAS Application Specific Abnormal Condition Id | 3 Byte | Any valid encoding of SAS Application Specific Abnormal Condition Id | Primary Key. Currently, the following possible values are defined. Number Not Found: i.e. the extracted received number was not found the Single Number Table nor in the Range Number Table. SAS Database Error: this is any kind of SAS database error. The outbound handling in this case will similar to the one of Number Not Found. In In addition an error report will be generated in order to trigger corrective action for database. |
| Response Action Id 1 | 3 Byte | Any valid Response Action | Encoding is SAS Application Service specific. NULL value is FFh. |
| Response Action Id 2 | 3 Byte | Any valid Response Action | Encoding is SAS Application Service specific. NULL value is FFh. |
| Response Action Id 3 | 3 Byte | Any valid Response Action | Encoding is SAS Application Service specific. NULL value is FFh. |
| Response Action Id 4 | 3 Byte | Any valid Response Action | Encoding is SAS Application Service specific. NULL value is FFh. |
| Response Action Id 5 | 3 Byte | Any valid Response Action | Encoding is SAS Application Service specific. NULL value is FFh. |
| Response Action Id 6 | 3 Byte | Any valid Response Action | Encoding is SAS Application Service specific. NULL value is FFh. |
| Response Action Id 7 | 3 Byte | Any valid Response Action | Encoding is SAS Application Service specific. NULL value is FFh. |
| Response Action Id 8 | 3 Byte | Any valid Response Action | Encoding is SAS Application Service specific. NULL value is FFh. |
| Response Action Id 9 | 3 Byte | Any valid Response Action | Encoding is SAS Application Service specific. NULL value is FFh. |
| Response Action Id 10 | 3 Byte | Any valid Response Action | Encoding is SAS Application Service specific. NULL value is FFh. |
| Output Digit String Id | 3 Byte | Any valid Input Digit String Id | Partial foreign key into the Structure of Output Digit String Configuration Table. SAS Application Service specific encoding. Multiple output digit strings per Protocol Element are possible. |

TABLE 17-continued

Details of the SAS Application Service Specific Outbound Processing
Configuration Table - Abnormal Completion
SAS Application Service Specific Outbound Processing Configuration Table -
Abnormal Completion

| Attribute | Format | Values | Description |
| --- | --- | --- | --- |
| Nature of Address Indicator | 1 Byte | Any valid protocol specific encoding of the Nature of Address Indicator. | Partial foreign key into the Structure of Output Digit String Configuration Table. NoAI in protocols has up to 7 bit for its encoding. Therefore, the value FFh is is used as NULL value for this attribute. Per input digit string, the NoAI has to be considered. Therefore, per Input Digit String Id, multiple NoAIs are possible. For each NoAI of an Input Digit String Id, an input digit string has to be defined. |

Handling of NoAI values in the outbound processing: the NoAI value of the output digit string can be determined from the following four sources:
1. The input digit string corresponding to the output digit string,
2. The selected entry of the Service Control Data table,
3. The output digit string, or
4. The SAS Application Service Specific Outbound Processing Configuration Table - Abnormal Completion (this table).
The NoAI in this table overrules the other three. If the NoAI value in this table is NULL, then the NoAI value of the selected output digit string has to be used. If the NoAI value of the selected output digit string is NULL, then the NoAI value of the selected entry of the Service Control Data Table has to be used. If this entry does not support a NoAI value, then NoAI value of the corresponding input digit string has to be used.
In general, the following kinds of response actions are obvious:
Return Message to Sender.
Return Error to Sender.
Forward Message to the Recipient to whom it would be routed without intervention of SAS.
Forward Message to configured Recipient.
Discard Message.

Table 18 contains the SAS Application Service Specific Outbound Digit String Preparation Configuration Table. This Configuration Table configures the generic Outbound Action "Digit Preparation in Outbound Digit String".

Services, wherein at least two different types of interactions can be configured: interaction Type A between ASTP Dispatcher and TCAP User Service, wherein the message to be processed is forwarded from the ASTP Dispatcher to the

TABLE 18

Details of the SAS Application Service Specific Outbound Digit String
Preparation Configuration Table
SAS Application Service Specific Outbound Digit String Preparation Configuration Table

| Attribute | Format | Values | Description |
| --- | --- | --- | --- |
| SAS Application Service Id | 2 Byte | Any valid SAS Application Service Id | Primary Key |
| Output Digit String Id | 3 Byte | Any valid Input Digit String Id | Partial foreign key into the Structure of Output Digit String Configuration Table SAS Application Service specific encoding: Multiple output digit strings per Protocol Element are possible |
| Output Digit String Component Id | 1 Byte | Any valid common encoding of Service Control Data Type and Auxiliary Number Name. | This attribute identifies the Output Digit String Element onto which the digit preparation applies. It is possible to specify here the complete Output Digit String by using the mnemonic "Total Digit String". |
| Cut Position | 1 Byte | Positive Integer values 0–255. | Effect: 0: The Digit Preparation is specified by means of the Cut Match/Value. 1: Cut Position is before the $1^{st}$ digit. 2: Cut Position is before the $2^{nd}$ digit. 3: Cut Position is before the $3^{rd}$ digit. n: Cut Position is before the $n^{th}$ digit. |
| Cut Length | 1 Byte | Positive Integer values 0–255. | Effect: 0: delete no digits after the Cut Position. 1: delete 1 digit after the Cut Position. 2: delete 2 digits after the Cut Position. 3: delete 3 digits after the Cut Position. N: delete n digits after the Cut Position. |
| Cut Match Length | 1/2 Byte | Positive Integer values 0–15. | Length in digits of the Cut Match Value. 0 means that there is no Cut Match |
| Cut Match Value | 7 1/2 Byte | Digit String with up 15 Digits. | The Cut Match Value is a sequence of digits, which if found in search from left to right, shall be replaced by the Paste Value. |
| Paste Length | 1/2 Byte | Positive Integer values 0–15. | Length in digits of the Paste Value. 0 means that there is no Paste Value. |
| Paste Value | 7 1/2 Byte | Digit String with up 15 Digits. | Value which shall be inserted at the Cut Position, or which shall replace the Cut Match Value. |

The invention claimed is:

1. SAS Service Architecture having a layered structure including a set of software modules, at least: ASTP Dispatcher, SCCP Transcoder for TCAP User, TCAP, at least one TCAP User Service Distributor, at least two TCAP User Services, wherein at least two different types of interactions can be configured: interaction Type A between ASTP Dispatcher and TCAP User Service, wherein the message to be processed is forwarded from the ASTP Dispatcher to the relevant TCAP User Service via SCCP Transcoder for TCAP User, TCAP, and the relevant TCAP User Service Distributor, and interaction Type B1 between two TCAP User Services assigned to the same TCAP User Service Distributor, wherein the TCAP User Service Distributor forwards the message to be processed to a second TCAP User Service dependent on the result of the outbound message of a first TCAP User Service.

2. SAS Service Architecture, as set forth in claim 1, wherein a further type of interaction can be configured: interaction Type C between two TCAP User Services assigned to different TCAP User Service Distributors, wherein TCAP forwards the message to be processed to a second TCAP User Service assigned to a second TCAP User Service Distributor dependent on the result of the outbound message of a first TCAP User Service assigned to a first TCAP User Service Distributor.

3. SAS Service Architecture, as set forth in claim 1, wherein the SAS Service Architecture further includes the software modules SCCP Transcoder, at least one SCCP Service Distributor, at least two SCCP Services, and wherein two further types of interaction can be configured: interaction Type D between a TCAP User Service and a SCCP User Service, wherein ASTP Dispatcher forwards the message to be processed to a TCAP User Service assigned to a TCAP User Service Distributor dependent on the result of the outbound message of a SCCP User Service assigned to a SCCP User Service Distributor, and interaction Type B2 between two SCCP User Services assigned to the same SCCP User Service Distributor, wherein the SCCP User Service Distributor forwards the message to be processed to a second SCCP User Service dependent on the result of the outbound message of a first SCCP User Service.

4. SAS Service Architecture, as set forth in claim 1, wherein the SAS Service Architecture further includes a common database pool to which all SAS Application Services have access.

5. Method to perform an analysis for a SAS application service, comprising the steps of:
performing an inbound message analysis,
performing a Service Decision,
performing an Outbound Message Synthesis using at least one Outbound Configuration Table.

6. Method, as set forth in claim 5, wherein the Service Decision further includes a Generic Loop Detection Analysis using a Loop Detection Configuration Table.

7. Method, as set forth in claim 5, wherein the Service Decision further includes a Database Search in a common database pool, which includes at least a Single Number Configuration Table and a Range Number Configuration Table.

8. Signaling application server, comprising at least one processor, at least one database and at least one processing software for processing at least one application service request, wherein the at least one processing software includes a signaling connection control part process and at least one transaction capabilities application part process to identify at least one application service request, and wherein processing a SAS application service, comprises the steps of:
performing an inbound message analysis,
performing a Service Decision including a database search in a common database pool,
performing an Outbound Message Synthesis using at least one Outbound Configuration Table.

9. SS7 signaling server for routing SS7 links, including a signaling transfer point, and a signaling application server,
wherein the STP has at least one external interface to connect the STP via at least one SS7 link to at least one telecommunications unit, and an internal interface to connect the STP to the SAS,
wherein the SAS comprises at least one processor, at least one database and at least one processing software for processing at least one application service request, wherein processing a SAS application service, comprises the steps of:
performing an inbound message analysis,
performing a Service Decision including a database search in a common database pool,
performing an Outbound Message Synthesis using at least one Outbound Configuration Table, and
wherein the STP is capable to process incoming SS7 messages, to identify a single application service request in one incoming SS7 message, to provide the identified single application service request to the SAS for further processing.

10. SAS Service Architecture having a layered structure including a set of software modules, at least: ASTP Dispatcher, SCCP Transcoder, at least one SCCP User Service Distributor, at least two SCCP User Services, wherein at least one type of interaction can be configured: interaction Type B2 between two SCCP User Services assigned to the same SCCP User Service Distributor, wherein the SCCP User Service Distributor forwards the message to be processed to a second SCCP User Service dependent on the result of the outbound message of a first SCCP User Service.

* * * * *